United States Patent
Saitou et al.

(10) Patent No.: US 12,255,325 B2
(45) Date of Patent: Mar. 18, 2025

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Motoharu Saitou, Hyogo (JP); Takeshi Ogasawara, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 425 days.

(21) Appl. No.: 16/638,837

(22) PCT Filed: Jul. 13, 2018

(86) PCT No.: PCT/JP2018/026441
§ 371 (c)(1),
(2) Date: Feb. 13, 2020

(87) PCT Pub. No.: WO2019/044204
PCT Pub. Date: Mar. 7, 2019

(65) Prior Publication Data
US 2021/0135211 A1 May 6, 2021

(30) Foreign Application Priority Data
Aug. 30, 2017 (JP) .................. 2017-165879

(51) Int. Cl.
*H01M 4/525* (2010.01)
*H01M 4/02* (2006.01)
*H01M 4/131* (2010.01)
*H01M 4/505* (2010.01)

(52) U.S. Cl.
CPC .......... *H01M 4/525* (2013.01); *H01M 4/131* (2013.01); *H01M 4/505* (2013.01); *H01M 2004/028* (2013.01)

(58) Field of Classification Search
CPC ...... H01M 4/525; H01M 4/131; H01M 4/505; H01M 2004/028
See application file for complete search history.

(56) References Cited

U.S. PATENT DOCUMENTS

| | | | |
|---|---|---|---|
| 2009/0035659 A1* | 2/2009 | Takeuchi | H01M 4/131 252/519.15 |
| 2009/0081548 A1 | 3/2009 | Nakura | |
| 2013/0277604 A1 | 10/2013 | Shimokita et al. | |
| 2016/0172663 A1 | 6/2016 | Saka et al. | |
| 2018/0277839 A1* | 9/2018 | Luo | H01M 4/1391 |
| 2020/0020946 A1* | 1/2020 | Hur | H01M 4/131 |

FOREIGN PATENT DOCUMENTS

| | | | | |
|---|---|---|---|---|
| JP | 10241691 A | * | 9/1998 | |
| JP | 2006-310181 A | | 11/2006 | |
| JP | 2006-351378 A | | 12/2006 | |
| JP | 2008-181839 A | | 8/2008 | |
| JP | 2013-239434 A | | 11/2013 | |
| JP | 2013-254639 A | | 12/2013 | |
| JP | 2016-110924 A | | 6/2016 | |
| WO | WO-2016103998 A1 | * | 6/2016 | ............. C01G 53/00 |
| WO | WO-2016136212 A1 | * | 9/2016 | .......... H01M 10/052 |
| WO | WO-2016175268 A1 | * | 11/2016 | ........... C01G 53/006 |

OTHER PUBLICATIONS

Büyükburç, Atıl and Aydınol, M. Kadri, "High rate capable manganese and tungsten doped freeze dried lithium cobalt oxide cathode material for secondary lithium-ion batteries", Sep. 11, 2016, Research Gate. (Year: 2016).*
Xie, Hongbin; Du, Ke; Hu, Guorong; Peng, Zhongdong; Cao, Yanbing, "The Role of Sodium in LiNi0.8Co0.015Al0.05O2 Cathode Material and Its Electrochemical Behaviors", Jan. 28, 2016, The Journal of Physical Chemistry, 120, pp. 3235-3241. (Year: 2016).*
Espacenet machine translation of Toyama (WO 2016/103998 A1). (Year: 2016).*
Espacenet machine translation of Goto et al. (WO 2016/136212 A1). (Year: 2016).*
Espacenet machine translation of Fukui et al. (JP 2008/181839 A) (Year: 2008).*
International Search Report dated Oct. 16, 2018, issued in counterpart application No. PCT/JP2018/026441, with English translation. (2 pages).

* cited by examiner

Primary Examiner — Haroon S. Sheikh
Assistant Examiner — Katharine A Caughron
(74) Attorney, Agent, or Firm — WHDA, LLP

(57) ABSTRACT

A positive electrode active material for nonaqueous electrolyte secondary batteries which allows the capacity of nonaqueous electrolyte secondary batteries to be increased and offers a smaller decrease in charge discharge cycle characteristics, and to provide a nonaqueous electrolyte secondary battery having such a positive electrode active material. A positive electrode active material for nonaqueous electrolyte secondary batteries according to the present invention includes a composite oxide containing Li, Ni, Co, Al, W and additive elements M, the proportion of Ni in the composite oxide being not less than 80 mol % relative to the total number of moles of the metal elements except Li, the additive elements M including at least either of an alkaline earth metal element and an alkali metal element except Li, and a tetravalent or higher valent element, the average valence of the additive elements M being not less than 3.6.

1 Claim, No Drawings

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

TECHNICAL FIELD

The present invention relates to techniques associated with positive electrode active materials for nonaqueous electrolyte secondary batteries, and with nonaqueous electrolyte secondary batteries.

BACKGROUND ART

Nonaqueous electrolyte secondary batteries which include a positive electrode, a negative electrode and a nonaqueous electrolyte, and are charged and discharged by the migration of lithium ions between the positive and negative electrodes have a high output and a high energy density. This type of secondary batteries has recently gained widespread use.

Positive electrode active materials are used in the positive electrodes of such nonaqueous electrolyte secondary batteries. For example, the following are known as such materials.

For example, PTL 1 discloses a positive electrode active material for nonaqueous electrolyte secondary batteries which includes a composite oxide containing Li, Ni, Co and additive elements M, wherein the additive elements M are two or more elements having higher oxygen affinity than nickel, and the average valence of the additive elements M is more than 3.

Further, for example, PTL 2 discloses a positive electrode active material for nonaqueous electrolyte secondary batteries which includes a composite oxide containing Li, Ni, Co, Al, element $M^1$ and elements $M^2$, wherein the element $M^1$ is at least one selected from the group consisting of Mn, Ti, Y, Nb, Mo and W, and the elements $M^2$ are at least two selected from the group consisting of Mg, Ca, Sr and Ba, with the proviso that the elements $M^2$ include at least Mg and Ca.

CITATION LIST

Patent Literature

PTL 1: Japanese Published Unexamined Patent Application No. 2008-181839
PTL 2: Japanese Published Unexamined Patent Application No. 2006-310181

SUMMARY OF INVENTION

As described above, composite oxides containing various additive elements are used as positive electrode active materials for nonaqueous electrolyte secondary batteries. Unfortunately, there is still room for improvement in terms of increasing the capacity of nonaqueous electrolyte secondary batteries and reducing the decrease in charge discharge cycle characteristics.

Objects of the present disclosure are therefore to provide a positive electrode active material for nonaqueous electrolyte secondary batteries which allows the capacity of nonaqueous electrolyte secondary batteries to be increased and offers a smaller decrease in charge discharge cycle characteristics, and to provide a nonaqueous electrolyte secondary battery having such a positive electrode active material.

A positive electrode active material for nonaqueous electrolyte secondary batteries according to an aspect of the present disclosure includes a composite oxide containing Li, Ni, Co, Al, W and additive elements M, the proportion of Ni in the composite oxide being not less than 80 mol % relative to the total number of moles of the metal elements except Li, the additive elements M including at least either of an alkaline earth metal element and an alkali metal element except Li, and a tetravalent or higher valent element, the average valence of the additive elements M being not less than 3.6.

A nonaqueous electrolyte secondary battery according to another aspect of the present disclosure includes a positive electrode including the above positive electrode active material for nonaqueous electrolyte secondary batteries.

The positive electrode active material for nonaqueous electrolyte secondary batteries provided in one aspect of the present disclosure allows the capacity of nonaqueous electrolyte secondary batteries to be increased and offers a smaller decrease in charge discharge cycle characteristics. The nonaqueous electrolyte secondary battery provided in one aspect of the present disclosure has such a positive electrode active material.

DESCRIPTION OF EMBODIMENTS

Composite oxides which contain Li, Ni, Co, Al and W and have a Ni proportion of not less than 80 mol % relative to the total number of moles of the metal elements in the composite oxide except Li are excellent positive electrode active materials for nonaqueous electrolyte secondary batteries. However, further improvements are desired in order to attain a higher capacity of nonaqueous electrolyte secondary batteries and to reduce the decrease in charge discharge cycle characteristics. The present inventors then carried out extensive studies on the composite oxides, and have found that the addition of specific additive elements to the composite oxide in a way that the additive elements satisfy a specific lower limit of their average valence makes it possible to increase the capacity of nonaqueous electrolyte secondary batteries and to reduce the decrease in charge discharge cycle characteristics. Specifically, the present inventors have developed a positive electrode active material for nonaqueous electrolyte secondary batteries which forms an aspect described below.

A positive electrode active material for nonaqueous electrolyte secondary batteries according to an aspect of the present disclosure includes a composite oxide containing Li, Ni, Co, Al, W and additive elements M, the proportion of Ni in the composite oxide being not less than 80 mol % relative to the total number of moles of the metal elements except Li, the additive elements M including at least either of an alkaline earth metal element and an alkali metal element except Li, and a tetravalent or higher valent element, the average valence of the additive elements M being not less than 3.6. The positive electrode active material for nonaqueous electrolyte secondary batteries according to an aspect of the present disclosure allows the capacity of nonaqueous electrolyte secondary batteries to be increased and offers a smaller decrease in charge discharge cycle characteristics, as compared to a positive electrode active material for nonaqueous electrolyte secondary batteries which includes a composite oxide containing Li, Ni, Co, Al and W and has a Ni proportion of not less than 80 mol % relative to the total number of moles of the metal elements in the composite oxide except Li.

The mechanisms of the above effects are not fully understood but are estimated as described below. The additive elements M in the composite oxide include at least either of an alkaline earth metal element and an alkali metal element except Li, and a tetravalent or higher valent element, and the average valence of the additive elements M is not less than 3.6. This configuration brings the average valence of Ni in the composite oxide below 3. As compared to when the average Ni valence is 3, the composite oxide releases an increased amount of Li and thus allows the capacity of a nonaqueous electrolyte secondary battery to be increased. It is probable that when the average Ni valence is below 3, tetravalent nickel which destabilizes the crystal structure does not occur even when Ni increases its valence during the charging and discharging of the battery, and thus the decrease in charge discharge cycle characteristics can be reduced.

When the proportion of Ni is not less than 80 mol % relative to the total number of moles of the metal elements except Li, the crystal structure may have, for example, Ni in Li sites or may have, for example, Li in Ni sites. Such ion mixing tends to result in a decrease in the charge discharge cycle characteristics of batteries. The occurrence of ion mixing is probably prevented by the alkaline earth metal element and/or the alkali metal element except Li present in the composite oxide, and consequently the decrease in charge discharge cycle characteristics of batteries is reduced as compared to when the composite oxide does not contain an alkaline earth metal element and/or an alkali metal element except Li. Further, the presence of W and the additive elements M having an average valence of 3.6 or above in the composite oxide will suppress oxygen release and will help the structure stabilize. Thus, the capacity of nonaqueous electrolyte secondary batteries is increased, and the decrease in charge discharge cycle characteristics is reduced as compared to when the composite oxide contains only either W or the additive elements M having an average valence of 3.6 or above.

Hereinbelow, an example of nonaqueous electrolyte secondary batteries using the positive electrode active material for nonaqueous electrolyte secondary batteries according to an aspect of the present disclosure will be described.

A nonaqueous electrolyte secondary battery according to an example embodiment includes a positive electrode, a negative electrode and a nonaqueous electrolyte. A separator is preferably disposed between the positive electrode and the negative electrode. Specifically, the structure is such that the positive electrode and the negative electrode are wound together via a separator to form a wound electrode assembly, and the electrode assembly and the nonaqueous electrolyte are accommodated in an exterior case. The electrode assembly is not limited to a wound electrode assembly, and may be other form of electrode assemblies such as a stacked electrode assembly in which the positive electrodes and the negative electrodes are stacked on top of one another via separators. The shape of the nonaqueous electrolyte secondary battery is not particularly limited and may be, for example, cylindrical, prismatic, coin, button or laminate.

Hereinbelow, the positive electrode, the negative electrode, the nonaqueous electrolyte and the separator which are used in the nonaqueous electrolyte secondary battery according to an example embodiment will be described in detail.

<Positive Electrodes>

The positive electrode includes a positive electrode current collector such as, for example, a metal foil, and a positive electrode active material layer disposed on the positive electrode current collector. The positive electrode current collector may be, for example, a foil of a metal that is stable at positive electrode potentials, such as aluminum, or a film having such a metal as a skin layer. For example, the positive electrode active material layer includes a positive electrode active material, a binder, a conductive agent, etc.

For example, the positive electrode may be obtained by applying a positive electrode mixture slurry including components such as a positive electrode active material, a binder and a conductive agent onto the positive electrode current collector, drying the wet film to form a positive electrode active material layer on the positive electrode current collector, and rolling the positive electrode active material layer.

The positive electrode active material includes a composite oxide containing Li, Ni, Co, Al, W and additive elements M. The proportion of Ni in the composite oxide is not less than 80 mol % relative to the total number of moles of the metal elements except Li. The additive elements M include at least either of an alkaline earth metal element and an alkali metal element except Li, and a tetravalent or higher valent element. The average valence of the additive elements M is 3.6 or above.

For example, the composite oxide is represented by the following general formula:

$$Li_xNi_yCo_zAl_vW_\alpha M_\beta O_{2-\gamma} \quad (1)$$

In the formula, x, y, z, v, $\alpha$, $\beta$ and $\gamma$ preferably satisfy $0.93<x<1.2$, $0.80 \le y<1$, $0<z<0.2$, $0<v \le 0.1$, $0<\alpha \le 0.01$, $0.001 \le \beta 0.02$, and $0 \le \gamma <0.05$. In the formula, M represents additive elements including at least either of an alkaline earth metal element and an alkali metal element except Li, and a tetravalent or higher valent element. The average valence of the additive elements M is 3.6 or above. The average valence (A) of the additive elements M is represented by the following equation:

$$A=(b_1 \times c_1 + b_2 \times c_2 + b_3 \times c_3 + \ldots)/B$$

In the equation, $b_1$, $b_2$, $b_3$, ... represent the amounts of the additive elements ($M_1$, $M_2$, $M_3$ ...), $c_1$, $c_2$, $c_3$, ... represent the valences of the additive elements $M_1$, $M_2$, $M_3$, ...), and $B = b_1 + b_2 + b_3 \ldots$.

For purposes such as, for example, preventing ion mixing and reducing the decrease in charge discharge cycle characteristics of batteries, the alkaline earth metal element as the additive element M is preferably selected from at least one of Mg, Ca, Sr and Ba. For purposes such as, for example, preventing ion mixing and reducing the decrease in charge discharge cycle characteristics of batteries, the alkali metal element as the additive element M is preferably selected from at least one of Na and K. In the calculation of the average valence (A) of the additive elements M, for example, the alkali metal is taken as monovalent, and the alkaline earth metal as divalent.

For reasons such as, for example, that the valence of Ni can be maintained below 3 and the capacity of batteries can be increased, the tetravalent or higher valent element as the additive element M is preferably selected from at least one of Mn, Ti, Si, Nb, Mo and Zr. In the calculation of the average valence (A) of the additive elements M, for example, Mn, Ti, Si and Zr are taken as tetravalent, Nb as pentavalent, and Mo as hexavalent.

To attain a higher capacity of batteries and to reduce the decrease in charge discharge cycle characteristics of batteries, the average valence of the additive elements M is 3.6 or above, and is preferably up to 5. If the average valence of the additive elements M exceeds 5, the valence of Ni falls far below 3 and the structure may be destabilized as compared to when the average valence of the additive elements M is from 3.6 to 5.

To attain a higher capacity of batteries and to reduce the decrease in charge discharge cycle characteristics of batteries, the proportion of the additive elements M in the composite oxide is, for example, preferably not less than 0.1 mol % and not more than 2 mol % relative to the total number of moles of the metal elements except Li (for example, β in the above formula is 0.001≤β≤0.02), and more preferably not less than 0.5 mol % and not more than 1.5 mol % (for example, β in the above formula is 0.005≤β≤0.015). To attain a higher capacity of batteries and to reduce the decrease in charge discharge cycle characteristics of batteries, the additive elements M preferably have a molar ratio of the at least either of an alkaline earth metal element and an alkali metal element except Li, to the tetravalent or higher valent element in the range of, for example, 1:99 to 1:1.

To attain a higher capacity of batteries and to reduce the decrease in charge cycle characteristics of batteries, the proportion of W in the composite oxide is, for example, preferably more than 0 mol % and not more than 1 mol % relative to the total number of moles of the metal elements except Li (for example, α in the above formula is 0<α≤0.01), and more preferably not less than 0.1 mol % and not more than 0.5 mol % (for example, α in the above formula is 0.001≤α≤0.005).

To attain a higher capacity of batteries and to reduce the decrease in charge cycle characteristics of batteries, the proportion of Al in the composite oxide is, for example, preferably not more than 10 mol % relative to the total number of moles of the metal elements except Li (for example, v in the above formula is 0<v≤0.1), and more preferably not less than 0.01 mol % and not more than 10 mol % (for example, v in the above formula is 0.0001≤v≤0.1).

To attain a higher capacity of batteries and to reduce the decrease in charge cycle characteristics of batteries, the proportion of Co in the composite oxide is, for example, preferably not more than 20 mol % relative to the total number of moles of the metal elements except Li (for example, z in the above formula is 0<z≤0.2).

To attain a higher capacity of batteries and to reduce the decrease in charge cycle characteristics of batteries, the proportion of Ni in the composite oxide is, for example, preferably not less than 80 mol % and less than 100 mol % relative to the total number of moles of the metal elements except Li (for example, y in the above formula is 0.8≤y<1).

The composite oxide may contain additive elements other than Li, Ni, Co, Al, W and the additive elements M while still achieving the advantageous effects of the present invention. Examples of such additional additive elements include boron (B), iron (Fe), copper (Cu), zinc (Zn), tin (Sn) and calcium (Ca).

For example, the average particle size of the composite oxide is preferably not less than 0.05 μm and not more than 1 μm, but is not particularly limited thereto. The average particle size is the volume average particle size measured by a laser diffraction method at which the cumulative volume curve reaches 50% median of the particle size distribution. The average particle size may be determined with, for example, a laser diffraction scattering grain size distribution analyzer (manufactured by HORIBA, Ltd.).

For example, the content of the composite oxide is preferably not less than 30 mass % and not more than 100 mass % relative to the total mass of the positive electrode active material, and is more preferably not less than 80 mass % and not more than 95 mass %. If the content of the composite oxide is less than 30 mass %, for example, the capacity of batteries may not be enhanced or the decrease in charge discharge cycle characteristics may not be reduced effectively as compared to when the content satisfies the above range. In addition to the composite oxide described hereinabove, the positive electrode active material may include a Li composite oxide, for example, a Ni-free Li composite oxide such as $LiCoO_2$ or $LiMn_2O_4$, or a Li composite oxide containing less than 80 mol % Ni relative to the total number of moles of the metal elements except Li.

An example method for producing the composite oxide will be described.

For example, a method for producing the composite oxide includes a first step of obtaining a Ni—Co—Al composite hydroxide, a second step of calcining the Ni—Co—Al composite hydroxide to obtain a Ni—Co—Al composite oxide, and a third step of mixing the Ni—Co—Al composite oxide, a lithium compound, a tungsten compound and a compound(s) containing additive elements M, and calcining the mixture to obtain a composite oxide containing Li, Ni, Co, Al, W and the additive elements M.

In the first step, for example, an alkaline solution such as sodium hydroxide is dropped to an aqueous solution of a Ni salt, a Co salt and an Al salt while performing stirring so as to control the pH to the alkaline side (for example, 8.5 to 11.5) and thereby a Ni—Co—Al composite hydroxide is precipitated (coprecipitated). The Ni salt, the Co salt and the Al salt are not particularly limited and may be, for example, sulfate salts, chlorides or nitrate salts.

In the second step, the Ni—Co—Al composite hydroxide is calcined at a temperature of, for example, 300° C. to 900° C. to form a composite oxide containing Ni, Co and Al.

In the third step, the Ni—Co—Al composite oxide, a W compound, a Li compound and a compound(s) containing additive elements M are mixed together, and the resultant mixture is calcined at, for example, 650° C. to 900° C. to give a composite oxide containing Li, Ni, Co, Al, W and the additive elements M. The Li compound is not particularly limited, and examples thereof include lithium carbonate and lithium hydroxide. Examples of the W compounds include tungsten oxides and tungstate salts. Examples of the compounds containing additive elements M include oxides and nitrate salts.

In the steps described above, the elements may be added in proportions that are determined so that the final composite oxide containing Li, Ni, Co, Al, W and the additive elements M will contain 80 mol % or more Ni relative to the total number of moles of the metal elements except Li.

Hereinbelow, other components contained in the positive electrode active material layer will be described.

Examples of the conductive agents contained in the positive electrode active material layers include carbon powders such as carbon black, acetylene black, Ketjen black and graphite. The conductive agents may be used singly, or two or more may be used in combination.

Examples of the binders contained in the positive electrode active material layers include fluoropolymers and rubbery polymers. Examples of the fluoropolymers include polytetrafluoroethylene (PTFE), polyvinylidene fluoride (PVdF), and modified products of these polymers. Examples of the rubbery polymers include ethylene-propylene-isoprene copolymer and ethylene-propylene-butadiene copolymer. The binders may be used singly, or two or more may be used in combination.

<Negative Electrodes>

The negative electrode includes a negative electrode current collector such as, for example, a metal foil, and a negative electrode active material layer disposed on the negative electrode current collector. The negative electrode current collector may be, for example, a foil of a metal that is stable at negative electrode potentials, such as copper, or a film having such a metal as a skin layer. For example, the negative electrode active material layer includes a negative electrode active material, a binder, a thickening agent, etc.

For example, the negative electrode may be obtained by applying a negative electrode mixture slurry including a negative electrode active material, a thickening agent and a binder onto the negative electrode current collector, drying the wet film to form a negative electrode active material layer on the negative electrode current collector, and rolling the negative electrode active material layer.

The negative electrode active material contained in the negative electrode active material layer is not particularly limited as long as it can store and release lithium ions. Examples thereof include carbon materials, metals which can be alloyed with lithium, and alloy compounds containing such metals. Examples of the carbon materials include graphites such as natural graphite, non-graphitizable carbon and artificial graphite, and cokes. Examples of the alloy compounds include those containing at least one metal alloyable with lithium. Silicon and tin are preferred elements which are alloyable with lithium, and compounds of these elements with oxygen, such as silicon oxides and tin oxides, may also be used. Further, mixtures of the above carbon materials with silicon or tin compounds are also usable. In addition to those described above, materials having higher charge discharge potentials vs lithium metal than, for example, carbon materials may also be used, with examples including lithium titanium oxide.

The binder contained in the negative electrode active material layer may be, for example, a fluoropolymer or a rubbery polymer similarly to one in the positive electrode. Further, among others, styrene-butadiene copolymer (SBR) and modified products thereof may also be used. Examples of the binders contained in the negative electrode active material layers include fluororesins, PAN, polyimide resins, acrylic resins and polyolefin resins, which are also usable in the positive electrode. When the negative electrode mixture slurry is prepared using an aqueous solvent, it is preferable to use, among others, styrene-butadiene rubber (SBR), CMC or a salt thereof, polyacrylic acid (PAA) or a salt thereof (such as PAA-Na or PAA-K, or a partially neutralized salt), or polyvinyl alcohol (PVA).

Examples of the thickening agents contained in the negative electrode active material layers include carboxymethylcellulose (CMC) and polyethylene oxide (PEO). The components described above may be each used singly, or two or more may be used in combination.

<Nonaqueous Electrolytes>

The nonaqueous electrolyte includes a nonaqueous solvent and an electrolyte salt dissolved in the nonaqueous solvent. The nonaqueous electrolyte is not limited to a liquid electrolyte (a nonaqueous electrolytic solution), and may be a solid electrolyte such as a gel polymer. Examples of the nonaqueous solvents include esters, ethers, nitriles such as acetonitrile, amides such as dimethylformamide, and mixtures of two or more kinds of these solvents. The nonaqueous solvent may be a halogenated solvent resulting from the substitution of the above solvent with a halogen atom such as fluorine in place of at least part of hydrogen.

Examples of the esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methyl propyl carbonate, ethyl propyl carbonate and methyl isopropyl carbonate, cyclic carboxylate esters such as γ-butyrolactone (GBL) and γ-valerolactone (GVL), and chain carboxylate esters such as methyl acetate, ethyl acetate, propyl acetate, methyl propionate (MP), ethyl propionate and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

Some preferred examples of the halogenated solvents are fluorinated cyclic carbonate esters such as fluoroethylene carbonate (FEC), fluorinated chain carbonate esters, and fluorinated chain carboxylate esters such as methyl fluoropropionate (FMP).

The electrolyte salt is preferably a lithium salt. Examples of the lithium salts include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, and n is 1 or 2), $LiB_{10}Cl_{10}$, LiCl, LiBr, LiI, chloroborane lithium, lithium lower aliphatic carboxylates, borate salts such as $Li_2B_4O_7$ and $Li(B(C_2O_4)F_2)$, and imide salts such as $LiN(SO_2CF_3)_2$ and $LiN(C_1F_{2l+1}SO_2)(C_mF_{2m+1}SO_2)$ {l and m are integers of 1 or greater}. The lithium salts may be used singly, or a plurality thereof may be used as a mixture. From points of view such as ion conductivity and electrochemical stability, $LiPF_6$ is preferably used. The concentration of the lithium salt is preferably 0.8 to 1.8 mol per L of the nonaqueous solvent.

<Separators>

For example, the separator may be a porous sheet having ion permeability and insulating properties. Specific examples of the porous sheets include microporous thin films, woven fabrics and nonwoven fabrics. Some preferred separator materials are olefin resins such as polyethylene and polypropylene, and celluloses. The separator may be a stack having a cellulose fiber layer and a thermoplastic resin fiber layer such as of olefin resin. The surface of the separator may be coated with an aramid resin or the like. A filler layer including an inorganic filler may be disposed in the interface(s) between the separator and at least one of the positive electrode and the negative electrode. Examples of the inorganic fillers include oxides containing at least one of titanium (Ti), aluminum (Al), silicon (Si) and magnesium (Mg), and phosphoric acid compounds. The surface of these inorganic fillers may be treated with hydroxides or the like. For example, the filler layer may be formed by applying a slurry of the filler to the surface of the positive electrode, the negative electrode or the separator.

EXAMPLES

Hereinbelow, the present invention will be further described based on EXAMPLES. However, it should be construed that the scope of the present invention is not limited to such EXAMPLES.

Example 1

[Synthesis of Positive Electrode Active Material]

Ni—Co—Al composite hydroxide [$Ni_{0.88}Co_{0.09}Al_{0.03}$] $(OH)_2$ obtained by a coprecipitation method was calcined at 600° C. for 2 hours to give a composite oxide containing Ni, Co and Al.

The Ni—Co—Al composite oxide, a tungsten salt, a magnesium salt, a manganese salt and a niobium salt were mixed together. The molar ratio of the total of Ni, Co and Al in the composite oxide to W and the total of Mg, Mn and Nb was 100:0.1:1. The mixture obtained above was mixed together with LiOH so that the molar ratio of Li in LiOH to the total of Ni, Co and Al would be 1.1:1. The resultant mixture was calcined in an oxygen atmosphere at 840° C. for 5 hours and was further calcined at 725° C. for 50 hours to give a composite oxide containing Li, Ni, Co, Al, W, Mg, Mn and Nb.

The proportion of Ni in the composite oxide was 87 mol % relative to the total number of moles of Ni, Co, Al, W, Mg, Mn and Nb. The average valence of the additive elements M, namely, Mg, Mn and Nb, was 3.67. A positive electrode active material of EXAMPLE 1 was thus obtained.

[Fabrication of Positive Electrode]

The positive electrode active material, carbon black as a conductive agent, and polyvinylidene fluoride as a binder were mixed together in a mass ratio of 100:10:3. Thereafter, N-methyl-2-pyrrolidone was added. A positive electrode mixture slurry was thus prepared. Next, the positive electrode mixture slurry was applied to both sides of an aluminum foil as a positive electrode current collector. The wet films were dried and compressed with a roller. A positive electrode was thus fabricated which had positive electrode active material layers on both sides of the positive electrode current collector.

[Fabrication of Negative Electrode]

Li metal was used as a negative electrode active material.

[Preparation of Nonaqueous Electrolytic Solution]

Lithium hexafluorophosphate ($LiPF_6$) was dissolved into ethylene carbonate (EC)/methyl ethyl carbonate (MEC) (3:7 by volume) mixed solvent with a concentration of 1 mol/L. A nonaqueous electrolyte was thus prepared.

[Fabrication of Battery]

A positive electrode current collector tab was attached to the positive electrode fabricated above, and a negative electrode current collector tab was also attached to the negative electrode. A separator was arranged between the electrodes, and the unit was wound into a coil, thus fabricating a wound electrode assembly. Next, the wound electrode assembly and the nonaqueous electrolytic solution were introduced into an aluminum laminate exterior case, and the periphery of the aluminum laminate exterior case was thermally welded. A nonaqueous electrolyte secondary battery was thus fabricated. The nonaqueous electrolyte secondary battery was charged at a constant current of 0.2 It (4.8 mA) to a voltage of 4.2 V and was thereafter charged at a constant voltage of 4.2 V until the current value reached 0.02 It (0.48 mA). After a rest of 10 minutes, the battery was discharged at a constant current of 0.5 It (12 mA) to a voltage of 2.5 V. The battery was stabilized by this one cycle of charging and discharging. The nonaqueous electrolyte secondary battery was thus obtained as a battery of EXAMPLE 1.

Example 2

A composite oxide containing Li, Ni, Co, Al, W, Mg, Mn and Nb was obtained under the same conditions as in EXAMPLE 1, except that the molar ratio of Mg, Mn and Nb was 2:4:4.

The average valence of the additive elements M, namely, Mg, Mn and Nb, was 4. A nonaqueous electrolyte secondary battery was fabricated in the same manner as in EXAMPLE 1 using the above composite oxide as the positive electrode active material of EXAMPLE 2.

Comparative Example 1

A composite oxide containing Li, Ni, Co and Al was obtained by mixing the Ni—Co—Al composite oxide with LiOH in a molar ratio of Li to the total of Ni, Co and Al of 1.1:1, and calcining the mixture under the same conditions as in Example 1

The proportion of Ni in the composite oxide was 88 mol % relative to the total number of moles of Ni, Co and Al. A nonaqueous electrolyte secondary battery was fabricated in the same manner as in EXAMPLE 1 using the above composite oxide as the positive electrode active material of COMPARATIVE EXAMPLE 1.

Comparative Example 2

A composite oxide containing Li, Ni, Co, Al and W was obtained under the same conditions as in EXAMPLE 1, except that the magnesium salt, the manganese salt and the niobium salt were not added.

Comparative Example 3

A composite oxide containing Li, Ni, Co, Al, Mg, Mn and Nb was obtained under the same conditions as in EXAMPLE 1, except that the molar ratio of Mg, Mn and Nb was 4:4:2, and that the tungsten salt was not added.

The average valence of the additive elements M, namely, Mg, Mn and Nb, was 3.4. A nonaqueous electrolyte secondary battery was fabricated in the same manner as in EXAMPLE 1 using the above composite oxide as the positive electrode active material of COMPARATIVE EXAMPLE 3.

Comparative Example 4

A composite oxide containing Li, Ni, Co, Al, W, Mg, Mn and Nb was obtained under the same conditions as in EXAMPLE 1, except that the molar ratio of Mg, Mn and Nb was 4:4:2.

The average valence of the additive elements M, namely, Mg, Mn and Nb, was 3.4. A nonaqueous electrolyte secondary battery was fabricated in the same manner as in EXAMPLE 1 using the above composite oxide as the positive electrode active material of COMPARATIVE EXAMPLE 4.

Comparative Example 5

A composite oxide containing Li, Ni, Co, Al, Mg, Mn and Nb was obtained under the same conditions as in EXAMPLE 1, except that the molar ratio of Mg, Mn and Nb was 3:3:3, and that the tungsten salt was not added.

The average valence of the additive elements M, namely, Mg, Mn and Nb, was 3.67. A nonaqueous electrolyte secondary battery was fabricated in the same manner as in EXAMPLE 1 using the above composite oxide as the positive electrode active material of COMPARATIVE EXAMPLE 5.

Comparative Example 6

A composite oxide containing Li, Ni, Co, Al, Mg, Mn and Nb was obtained under the same conditions as in EXAMPLE 1, except that the molar ratio of Mg, Mn and Nb was 2:4:4, and that the tungsten salt was not added.

The average valence of the additive elements M, namely, Mg, Mn and Nb, was 4. A nonaqueous electrolyte secondary battery was fabricated in the same manner as in EXAMPLE 1 using the above composite oxide as the positive electrode active material of COMPARATIVE EXAMPLE 6.

[Measurement of Initial Charge and Discharge Capacities]

At an environmental temperature of 25° C., the batteries of EXAMPLES and COMPARATIVE EXAMPLES were charged at a constant current of 0.2 It to a battery voltage of 4.2 V, and were thereafter charged at the constant voltage until the current value became 0.02 It. Subsequently, the batteries were discharged at a constant current of 0.5 It to a battery voltage of 2.5 V. The charge capacity and the discharge capacity in this process were obtained as the initial charge capacity and the initial discharge capacity. The larger the value of initial discharge capacity, the greater the battery capacity increase.

[Measurement of Capacity Retention after Charge Discharge Cycles]

The batteries of EXAMPLES and COMPARATIVE EXAMPLES were subjected to ten cycles of the above charging and discharging process. The charging and the discharging in each cycle were each followed by a rest of 10 minutes. The capacity retentions of the batteries of EXAMPLES and COMPARATIVE EXAMPLES after the charge discharge cycles were determined using the following equation. The larger the value, the smaller the decrease in charge discharge cycle characteristics.

Capacity retention=(Discharge capacity in 10th cycle/Initial discharge capacity)×100

Table 1 describes the elements constituting the composite oxides used in EXAMPLES and COMPARATIVE EXAMPLES, the average valences of the additive elements M, i.e., Mg, Mn and Nb, and the initial charge and discharge capacities and the capacity retentions after charge discharge cycles of the batteries of EXAMPLES and COMPARATIVE EXAMPLES.

The composite oxides used in EXAMPLES and COMPARATIVE EXAMPLES contained not less than 80 mol % Ni relative to the total number of moles of the metal elements except Li in the composite oxide. EXAMPLES 1 and 2 which used the composite oxide composed of Li, Ni, Co, Al, W, Mg, Mn and Nb and having an average valence of additive elements M, i.e., Mg, Mn and Nb, of not less than 3.6 attained a high initial discharge capacity and a high capacity retention after charge discharge cycles as compared to COMPARATIVE EXAMPLE 1 in which the composite oxide was composed of Li, Ni, Co and Al without W, Mg, Mn and Nb, COMPARATIVE EXAMPLE 2 in which the composite oxide was composed of Li, Ni, Co, Al and W without Mg, Mn and Nb, COMPARATIVE EXAMPLE 3 in which the composite oxide was composed of Li, Ni, Co, Al, Mg, Mn and Nb without W and the additive elements M, i.e., Mg, Mn and Nb, had an average valence of less than 3.6, COMPARATIVE EXAMPLE 4 in which the composite oxide was composed of Li, Ni, Co, Al, W, Mg, Mn and Nb and the additive elements M, i.e., Mg, Mn and Nb, had an average valence of less than 3.6, and COMPARATIVE EXAMPLES 5 and 6 in which the composite oxide was composed of Li, Ni, Co, Al, Mg, Mn and Nb without W and the additive elements M, i.e., Mg, Mn and Nb, had an average valence of not less than 3.6.

The invention claimed is:

1. A positive electrode active material for nonaqueous electrolyte secondary batteries, the positive electrode active material consisting essentially of:

a composite oxide containing Li, Ni, Co, Al, W and additive elements M, a proportion of Ni in the composite oxide being at least 80 mol % relative to the total number of moles of the metal elements except Li, wherein the composite oxide is represented by the following general formula:

$Li_xNi_yCo_zAl_vW_\alpha M_\beta O_{2-\gamma}$ wherein x, y, z, v, α, β and γ satisfy $0.93<x<1.2$, $0.80 \leq y<1$, $0<z<0.2$, $0<v \leq 0.1$, $0<\alpha \leq 0.01$, $0.001 \leq \beta \leq 0.02$, and $0 \leq \gamma<0.05$, and M represents the additive elements M, the additive elements M including Mg as a sole element selected from the group consisting of an alkaline earth metal element and an alkali metal element except Li, and the additive elements M further includes a tetrava-

TABLE 1

| | Composite oxide | | Initial charge capacity (mAh/g) | Initial discharge capacity (mAh/g) | Capacity retention (%) |
|---|---|---|---|---|---|
| | Constituent elements | Average valence of additive elements (Mg/Mn/Nb) | | | |
| EX. 1 | Li/Ni/Co/Al/Mg/Mn/Nb/W | 3.67 | 225.9 | 187.4 | 94.4 |
| EX. 2 | Li/Ni/Co/Al/Mg/Mn/Nb/W | 4 | 223.6 | 184.8 | 94.1 |
| COMP. EX. 1 | Li/Ni/Co/Al | — | 222.0 | 167.1 | 89.5 |
| COMP. EX. 2 | Li/Ni/Co/Al/W | — | 225.6 | 182.1 | 89.2 |
| COMP. EX. 3 | Li/Ni/Co/Al/Mg/Mn/Nb | 3.4 | 208.7 | 142.1 | 79.7 |
| COMP. EX. 4 | Li/Ni/Co/Al/Mg/Mn/Nb/W | 3.4 | 222.8 | 180.7 | 89.0 |
| COMP. EX. 5 | Li/Ni/Co/Al/Mg/Mn/Nb | 3.67 | 216.8 | 157.6 | 76.1 |
| COMP. EX. 6 | Li/Ni/Co/Al/Mg/Mn/Nb | 4 | 216.9 | 157.3 | 76.3 | lent or higher valent element, the average valence of the additive elements M being not less than 3.6 and not more than 4,
wherein the tetravalent or higher valent element consists of Nb and Mn.

* * * * *